United States Patent Office 3,156,966
Patented Nov. 17, 1964

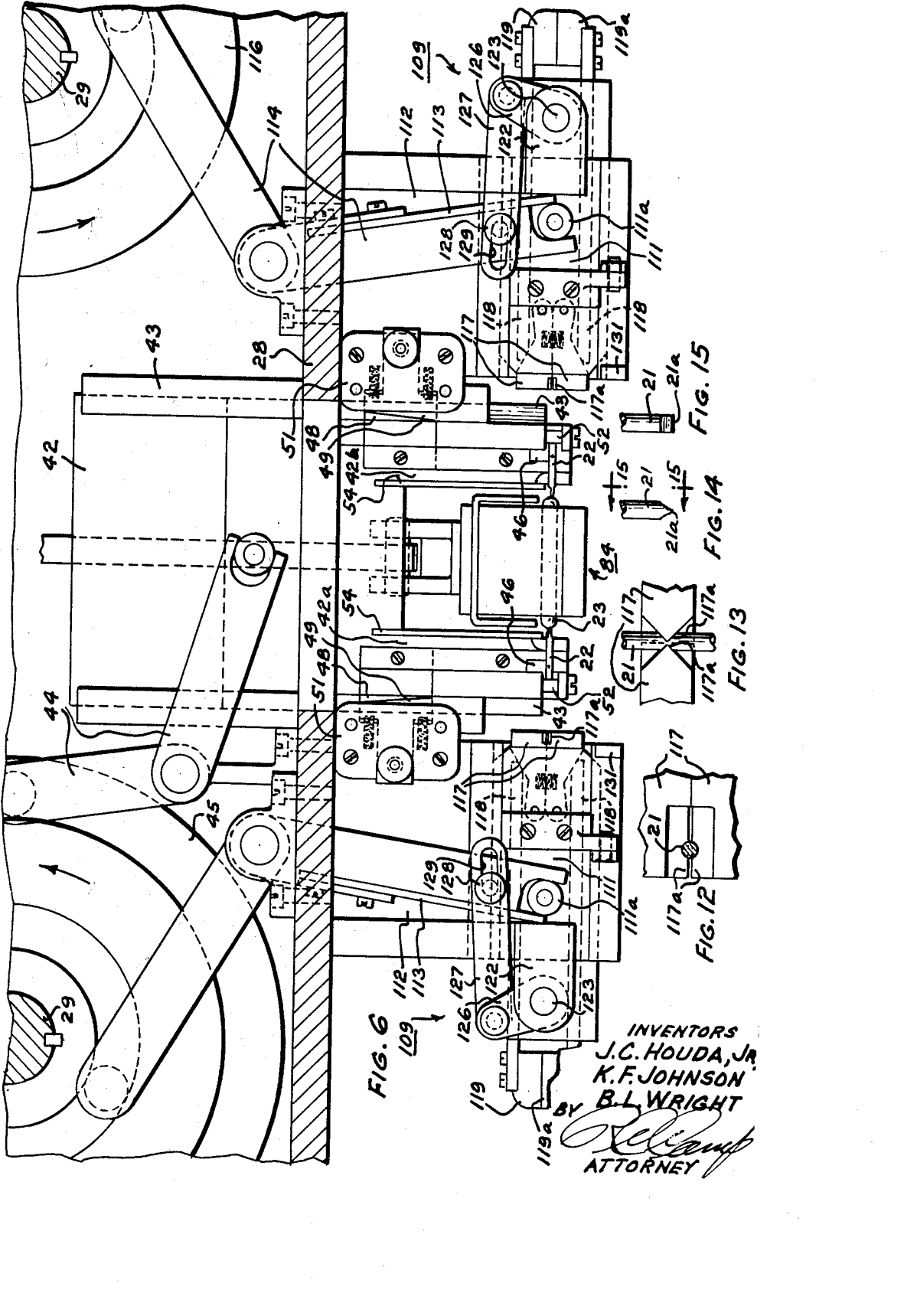

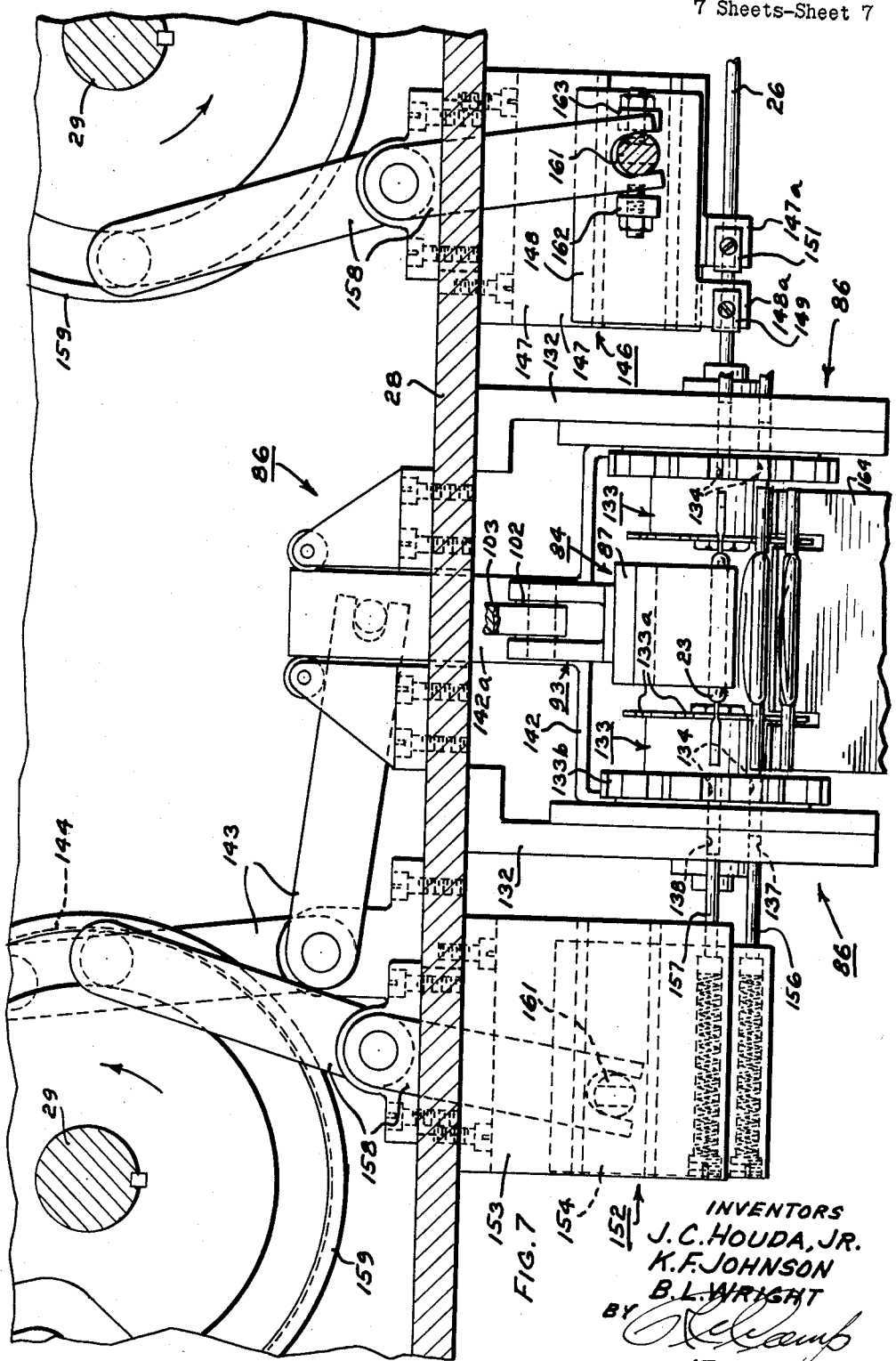

3,156,966
ARTICLE HANDLING AND WELDING
APPARATUS
James C. Houda, Jr., Downers Grove, Kenneth F. Johnson, Oak Lawn, and Ben L. Wright, Chicago, Ill., assignors to Western Electric Company, Incorporated, a corporation of New York
Filed Feb. 24, 1961, Ser. No. 91,404
16 Claims. (Cl. 29—33)

This invention relates to article handling and welding apparatus, and more particularly to article handling and welding apparatus for electrically welding wire to opposite end portions of an article and subsequently positioning short lengths of tubing over the end portions of the article and portions of the wires adjacent the end portions.

It is standard practice to secure wire leads to the terminals of certain electrical components by hand-soldering, and subsequently to position short lengths of protective insulating tubing over the terminals and portions of the wire leads adjacent the terminals by hand. In this operation, the wire leads and the insulating tubing are commonly pre-cut to the proper length manually. This procedure is inefficient and relatively time consuming because it involves a great number of manual operations including considerable handling of the electrical components, the wire leads and the short lengths of tubing, all of which generally are of small size and difficult to manipulate. Further, this procedure is especially undesirable where dirt, grease, or other foreign matter has accumulated on the terminals of the components, because solder will not properly bond to the terminals and the connections between the terminals and the wire leads later may break, thereby causing operating failures. On the other hand, when electrical welding is used to weld the wire leads to the terminals, as in the apparatus of the present invention, the electrical arcs burn away any foreign matter and secure welded connections are obtained.

A preferred form of the invention is designed to electrically weld ends of a pair of wires to terminals of an electrical component, to cut the welded wires to the proper lead lengths, to shear protective insulating tubing into predetermined lengths, and to position the lengths of tubing over the terminals of the component and portions of the welded wire leads adjacent the terminals. In the welding operation, an end of each wire is moved into engagement with a terminal for welding thereto by a percussion assembly which is constructed in two parts separated by a resilient spring so that weakening of a weld due to excessive impact by the end of the wire with the terminal, or rebound of the end of the wire away from the terminal, is reduced substantially to a minimum. In cutting the wires to proper length, each wire is cut only partially through at high speed and with great inertia, the remaining portion of the wire being severed by the force of the impact to form a projection in the form of a thin wedge on the new end of the wire. This wedge-like projection concentrates the electrical field during a welding operation and substantially insures a strong electrical welding arc between the new end of the wire and a next terminal to which it is to be welded.

An object of this invention is to provide new and improved welding apparatus.

Another object of this invention is to provide new and improved welding apparatus for securely welding wire to an article.

A further object of this invention is to provide a new and improved percussion assembly for moving an article into engagement with another article for electrically welding the articles to one another.

A further object of this invention is to provide a new and improved wire-cutting device.

A further object of this invention is to provide new and improved apparatus for welding wire leads to the terminals of electrical components and subsequently positioning lengths of insulating tubing over the terminals, without the necessity of manually handling the components, the wire leads, or the lengths of tubing.

Other objects, advantages and novel aspects of the invention will become apparent upon consideration of the following detailed description in conjunction with the accompanying drawings wherein:

FIG. 6 is a cross-sectional view taken substantially along the line 6—6 of FIG. 1;

FIG. 7 is a cross-sectional view taken substantially along the line 7—7 of FIG. 2;

FIG. 8 is a partial cross-sectional view taken substantially along the line 8—8 of FIG. 3;

FIG. 9 is an enlarged view of a percussion welding unit used in the apparatus of FIGS. 1–8, and shown at the left side of FIG. 4;

FIG. 10 is a partial end view taken substantially along the line 10—10 of FIG. 1;

FIG. 11 is a cross-sectional view taken substantially along the line 11—11 of FIG. 1;

FIG. 12 is an enlarged plan view of the cutting edges of a pair of wire-cutting blades used in the apparatus of FIGS. 1–8 and shown at the bottom of FIG. 6, the cutting blades being in a closed wire-cutting position;

FIG. 13 is a front view of the wire-cutting blades shown in FIG. 12;

FIG. 14 is a view of an end portion of a wire after being cut by the wire-cutting blades shown in FIGS. 12 and 13;

FIG. 15 is a side view of the same wire taken substantially along the line 15—15 of FIG. 14;

FIG. 16 is a front view of a dry reed switch such as the apparatus of FIGS. 1–13 is designed to accommodate;

FIG. 17 is a front view of the dry reed switch of FIG. 16 after wires have been welded to its terminals; and FIG. 18 is a front view of the dry reed switch of FIGS. 16 and 17 after wires welded to its terminals have beent cut to form wire leads, and protective tubing has been positioned over the terminals.

Figure 1:
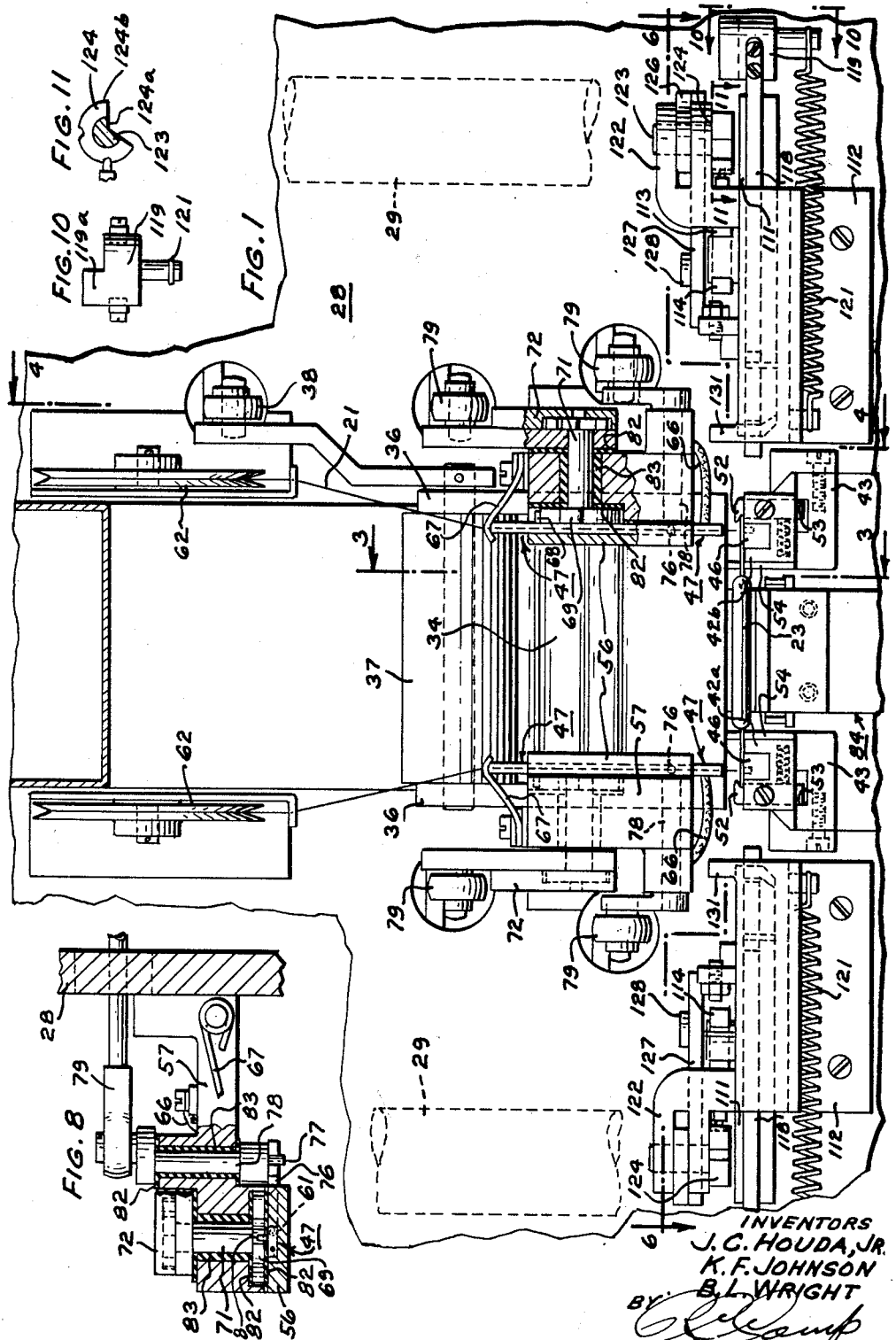
FIG. 1 is a front view of an upper portion of the apparatus with certain parts shown in cross-section.

As is best shown in FIGS. 1, 2 and 16–18, the illustrated embodiment of the invention is designed to electrically weld wires 21 to opposite terminals 22 of dry reed switches 23, cut the wires 21 to proper lead lengths to produce wire leads 24 (FIG. 18), and to shear protective insulating tubing 26 into predetemined lengths and position the cut lengths of tubing 27 (FIG. 18) over the terminals and portions of the wire leads adjacent the terminals. It is to be understood that this embodiment is solely for the purpose of illustrating the principles of the invention, and that the principles of the invention are not limited to the specific arrangement shown, but may be used in other arrangements as may readily be devised by those skilled in the art.

Figure 2:
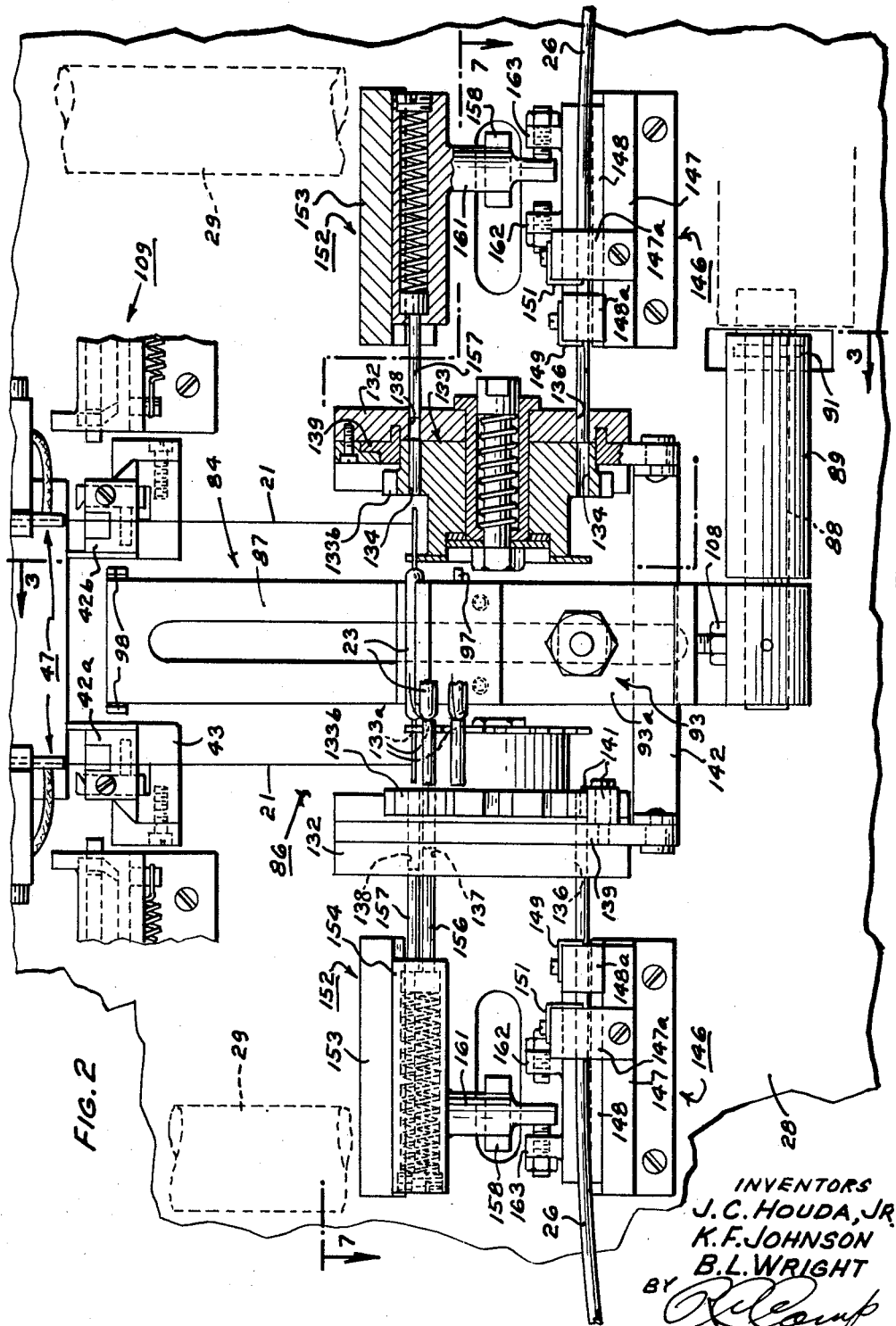
FIG. 2 is a front view of a lower portion of the apparatus with certain parts shown in cross-section.
Figure 3:
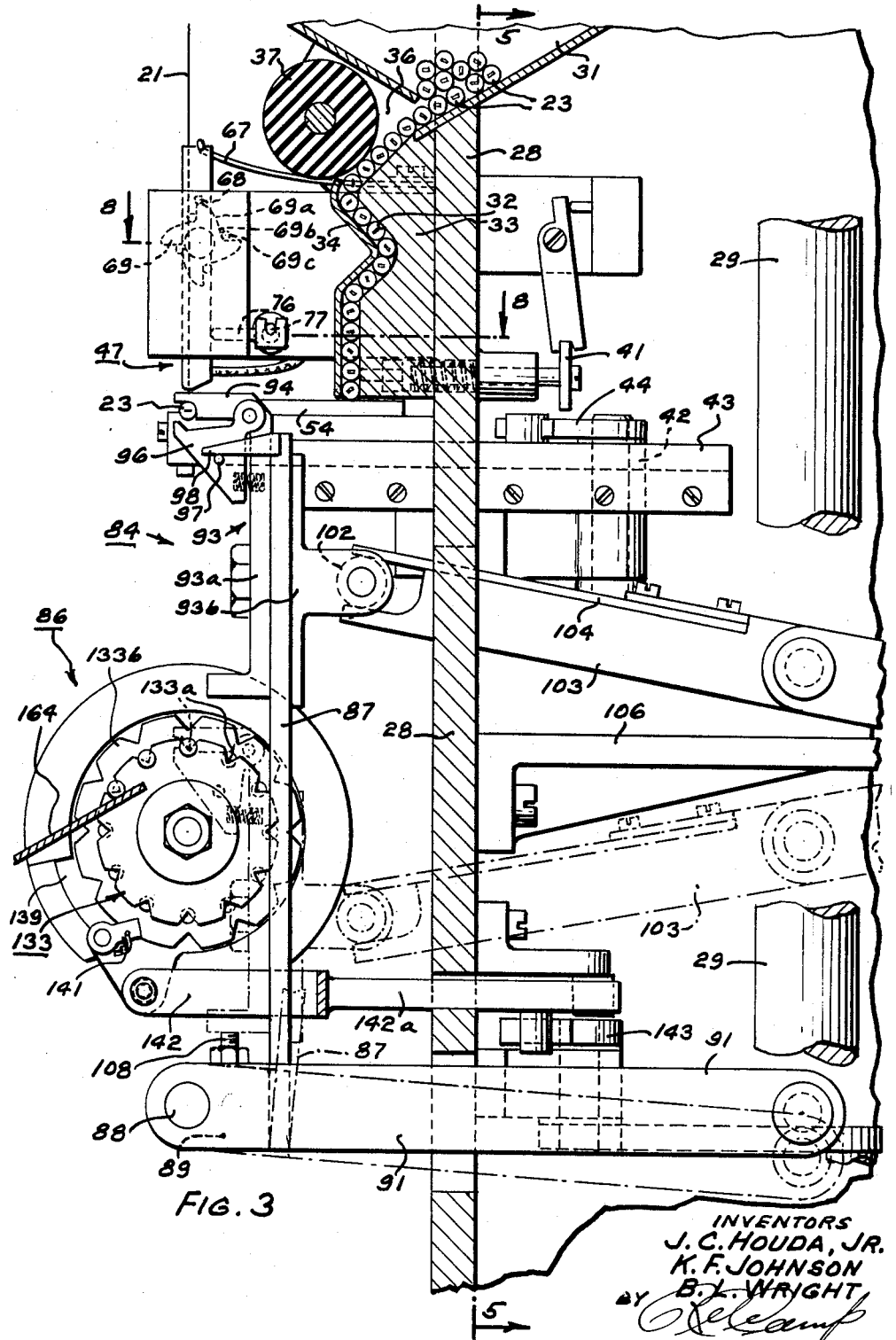
FIG. 3 is a cross-sectional view taken substantially along the line 3—3 of FIG. 1 and the line 3—3 of FIG. 2.
Figure 5:
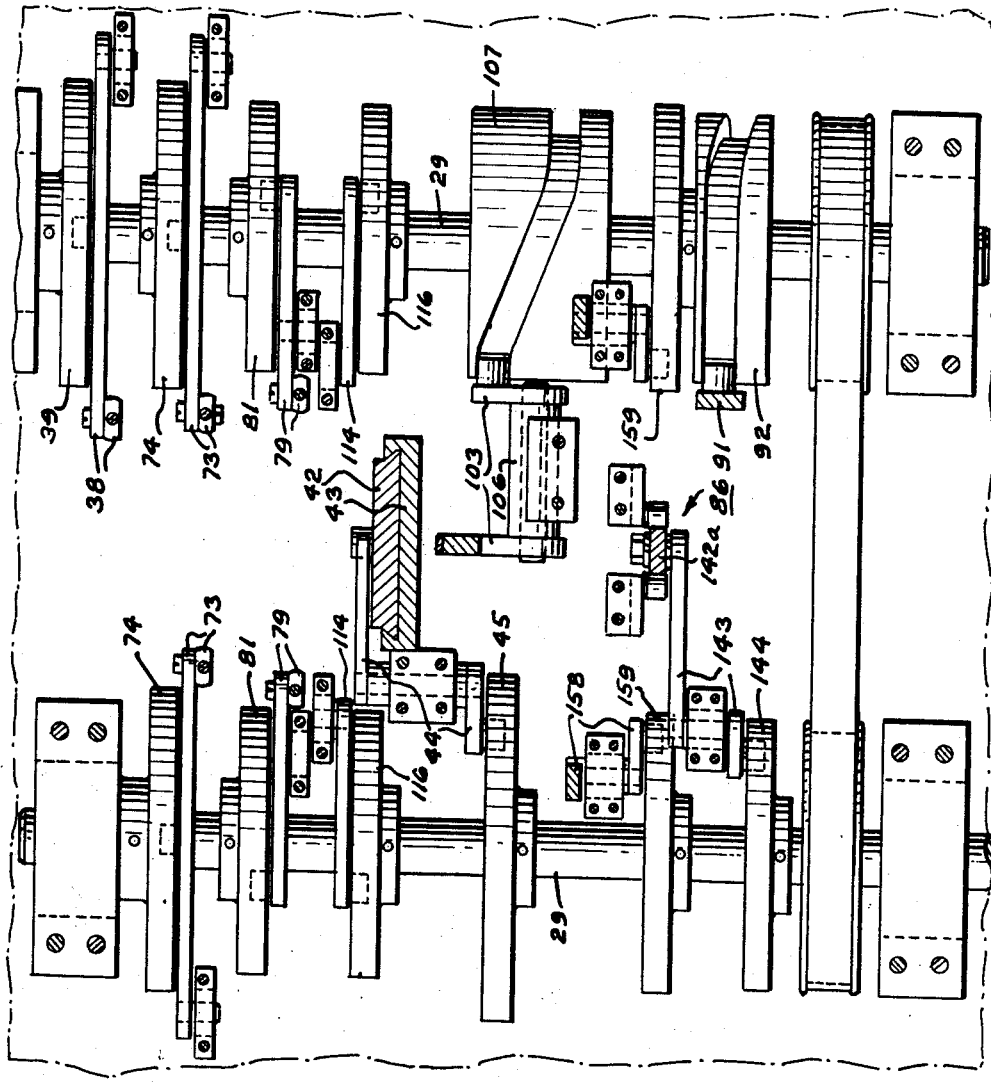
FIG. 5 is a cross-sectional view taken substantially along the line 5—5 of FIG. 3.

The illustrated embodiment of the invention includes an upstanding main support wall 28, which can be seen extending vertically up the center of FIG. 3, and horizontally across the centers of FIGS. 6 and 7. The main support wall 28 serves as a support upon which the various parts of the apparatus are mounted, and divides the front of the apparatus (left side of FIG. 3 and bottom of FIGS. 6 and 7) from the back of the apparatus (right side of FIG. 3 and top of FIGS. 6 and 7). Referring to FIGS. 1, 2 and 5, it is seen that the apparatus includes a pair of vertical operating cam shafts 29 mounted in suitable bearings on the back of the main support wall 28, and the left-hand side of the apparatus and the right-hand side of the apparatus are substantially the same, with certain exceptions which subsequently will become apparent.

Figure 4:
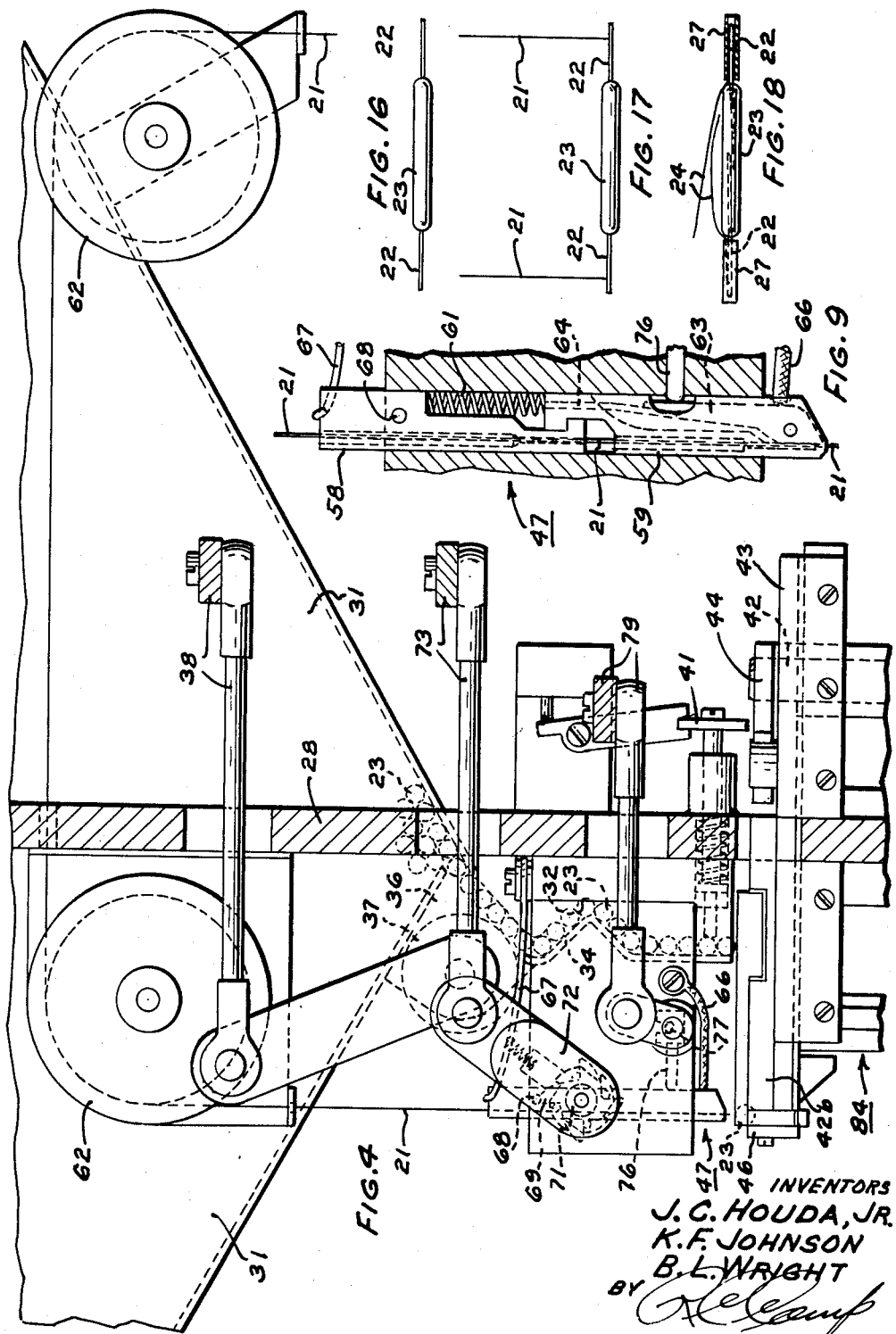
FIG. 4 is a cross-sectional view taken substantially along the line 4—4 of FIG. 1.

Referring to the upper part of FIGS. 3 and 4, it is seen that the dry-reed switches 23 are stored in a hopper 31 mounted on the main support wall 28 in a slot through the upper portion of the wall. The dry reed switches 23 feed from the hopper 31 by gravity into a curving substantially vertical feed slot 32 formed in a block member 33 (FIG. 3) which is mounted on the front of the main support wall 28 and which has a front cover plate 34. The block member 33 includes a pair of laterally-spaced forwardly projecting lugs 36 between which is mounted a roller 37 for aligning the dry reed switches in a single layer so that they will not pile up at the entrance to the vertical feed slot 32 and will not become twisted in the feed slot. The roller 37 is rotatably oscillated about its longitudinal axis by an upstanding link member pinned thereto and connected by a ball and socket joint to a reciprocating rod of a lever assembly 38 for universal movement relative to the reciprocating rod. The reciprocating rod of the lever assembly 38 extends rearwardly through an aperture in the main support wall 28, and, as shown in FIG. 5, the lever assembly 38 is pivotally mounted on the back of the main support wall 28 and includes a cam follower riding in a cam track in a cam 39 on one of the operating cam shafts 29. Mounted adjacent the lower end of the vertical feed slot 32 is a safety device including a spring biased plunger 41, which normally prevents vertical downward movement of the dry reed switches in the feed slot, as shown in FIG. 3, and which moves into the feed slot when it is empty of dry reed switches to operate a control switch and thereby to stop the apparatus.

Adjacent the lower end of the vertical feed slot 32, a horizontally-reciprocating carriage 42 (FIGS. 3 and 6) is movable in a guideway member 43 mounted on the main support wall 28. The carriage 42 is reciprocated between a retracted position and an advanced position by a double arm lever assembly 44 which is pivotally mounted (FIG. 5) on the back of the main support wall 28, and which has one of its arms pivotally and slidably connected to the carriage, and its other arm operatively connected to a cam 45 on one of the operating cam shafts 29.

When the carriage 42 is in its retracted position, a single dry reed switch 23 drops by gravity from the vertical feed slot 32 and the terminals of the switch are received on respective electrodes 46 (FIGS. 1 and 6) mounted adjacent the front ends of a pair of laterally spaced, forwardly extending projections 42a and 42b of the carriage. To prevent welding of the ends of the wires 21 to the electrodes 46 in those instances where one of the dry reed switches 23 does not feed properly from the vertical feed slot 32 onto the electrodes, the electrodes have recesses (FIG. 1) formed in the top surfaces thereof which are adapted to receive the ends of the wires as they are moved toward the electrodes by a pair of reciprocating percussion welding assemblies 47, subsequently to be described. The electrodes 46 are electrically connected by leads in longitudinally-extending covered slots in the projections 42a, 42b of the carriage 42, to contacts 48 (FIG. 6) on the projections adjacent their junctions with the remainder of the carriage. When the carriage 42 is in its advanced position, the fixed contacts 48 engage movable spring biased contacts 49, which are carried in insulator blocks 51 on the guideway member 43, and which are electrically connected through terminals on the insulator blocks, to a suitable electrical source, as for example, respective banks of capacitors (not shown).

Mounted on the projections 42a, 42b of the carriage 42 adjacent the electrodes 46 are a pair of spring biased pivoted jaws 52 (FIGS. 1 and 6) of suitable insulating material, for holding the dry reed switch terminals 22 on the electrodes. The lower ends of the pivoted jaws 52 slidably engage rearwardly converging cam surfaces 53 (FIG. 1) on the guideway member 43, whereby the jaws are pivoted to permit one of the dry reed switches 23 to fall from the vertical feed slot 32 onto the electrodes 46 when the carriage 42 is in its retracted position. Mounted on the facing sides of the projections 42a, 42b of the carriage 42, are a pair of escapement members 54 of suitable insulating material. When the carriage 42 moves to its advanced position, the escapement members 54 prevent the dry reed switches 23 in the vertical feed slot 32 from falling out of the slot, and insulate the dry reed switches in the vertical feed slot from the dry reed switch on the electrodes 46. When the carriage is in its retracted position, the escapement members 54 move the plunger of the safety device 41 rearwardly to permit vertical movement of the dry reed switches 23 in the vertical feed slot 32.

When the carriage 42 is in its advanced position, the terminals of the dry reed switch 23 supported on the electrodes 46 are vertically beneath respective ones of the above mentioned reciprocating percussion welding assemblies 47 (FIGS. 1 and 3), which move the ends of the wires 21 into engagement with the dry reed switch terminals 22 to electrically weld the ends of the wires to the terminals. Each of the percussion welding assemblies 47 is slidably mounted in a vertical slot in a side plate 56 (FIG. 1) bolted to one side of a housing member 57 mounted on the main support wall 28 (FIG. 8). As shown in FIG. 9, each of the percussion welding assemblies 47 includes an upper driving member 58 and a lower percussion member 59, the members 58, 59 being connected for movement relative to one another and having a coil spring 61 disposed therebetween. Each of the wires 21, which wires are guided to the percussion welding assemblies 47 over insulated pulleys 62 (FIG. 4) and through insulated apertures in the main support wall 28, extends downward through vertically aligned apertures in its associated driving and percussion members 58, 59 so that its end projects slightly beyond the percussion member, and is releasably gripped in the percussion member 59 by a jaw 63 pivoted in the percussion member and biased clockwise, as viewed in FIG. 9, by a leaf spring 64. Each of the percussion members 59 is in the form of an electrode and is electrically connected through a lead 66 to an electrical source, such as one of the above mentioned banks of capacitors which are connected to the electrodes 46. As each of the percussion welding assemblies 47 is driven downward by a driving spring 67, which is mounted on an insulator member on the housing member 57 (FIGS. 1 and 8) associated with the percussion welding assembly, the bank of capacitors associated with the percussion welding assembly discharges and an electrical arc forms between the end of the wire 21 projecting from the percussion assembly and the dry reed switch terminal 22 therebeneath, and the end of the wire is welded securely to the terminal. In this regard, weakening of the thus formed weld because of excessive impact of the end of the wire 21 with the terminal 22, or because of rebound of the end of the wire away from the terminal, substantially is reduced by the coil spring 61 which absorbs the inertia of the driving member 58 and prevents rebound of the percussion member 59.

Each driving member 58 includes a laterally projecting pin 68 for limiting the downward movement of its percussion welding assembly 47. Each limit pin 68 is urged downward, by the action of the driving spring 67 of its percussion welding assembly 47, into engagement with a rotatable firing cam 69 (FIGS. 1, 3 and 4). Each of the rotatable firing cams 69 is provided with a plurality of successive peripheral camming surfaces 69a (FIGS. 3 and 4) separated by successive peripheral recesses 69b, and is rigidly connected to one end of a shaft 71 rotatably mounted in its associated housing member 57 (FIGS. 1 and 8). Connected to the other end of each rotatable shaft 71 is a pawl and ratchet mechanism 72 operatively connected by a lever assembly 73 (FIGS. 4 and 5), which is pivotally mounted on the back of the main support wall 28, to a cam 74 on a respective one of the operating cam shafts 29. Each cam 74 has a configuration such that the rotatable firing cam 69 associated therewith is rotated in a step-by-step manner by its pawl and ratchet mechanism 72, whereby its percussion welding assembly 47 alternately is raised to an upper cocked position by the camming surfaces 69a and, upon the limit pin 68 of the percussion welding assembly leaving one of the camming surfaces, is driven downward by its driving spring 67 to move the end of the wire 21 carried thereby into welding engagement with the dry reed switch terminal 22 therebeneath. The limit pin 68 moves downward in the recesses 69b of the rotatable firing cam 69 into engagement with stops 69c which cooperate with the limit pin to prevent the percussion welding assembly 47 from engaging the electrode 46 therebeneath. The limit pin 68, when engaged in the recesses 69b against the stops 69c, also prevents rotation of the rotatable firing cam 69 in a counterclockwise direction, as viewed in FIG. 3. Subsequently, after the dry reed switch 23 on the electrodes 46 has been removed from the electrodes, the wires 21 have been cut to proper lengths to produce the wire leads 24, and the carriage 42 has been moved to its retracted position, each rotatable firing cam 69 is rotated an additional increment by its pawl and ratchet mechanism 72, lever assembly 73 and cam 74, whereby the limit pin 68 associated with the firing cam is free to move into the bottom of the recess 69b in which the pin is engaged, and the percussion welding assembly 47 is driven downward by its driving spring 67 to position the lower end of the percussion member 59 in substantially transverse alignment with the cut end of the wire 21 carried by the percussion welding assembly.

An upper portion of each wire-gripping jaw 63 is engaged with one end of a longitudinally slidable release plunger 76 (FIGS. 4, 8 and 9) in the side plate 56 associated with the wire-gripping jaw, the release plunger 76 being movable to the left, as viewed in FIG. 9, to pivot the wire-gripping jaw counterclockwise, whereby the wire 21 gripped by the jaw is released for free running movement through its percussion welding assembly 47. The other end of each release plunger 76 includes a vertical slot which slidably receives an off-center camming pin 77 on one end of a shaft 78 rotatably mounted in the housing member 57 associated with the release plunger. Each rotatable shaft 78 is pinned to a lever assembly 79 which is pivotally mounted on the back of the main support wall 28 and which is operatively connected to a suitable cam 81 on a respective one of the operating cam shafts 29 (FIG. 5). Each cam 81 is of such configuration that after the cam 74 associated therewith has rotated its rotatable firing cam 69 to move the percussion welding assembly 47 upward slightly from its lowermost position wherein the lower end thereof is in transverse alignment with the cut end of the wire 21 carried thereby, as describd above in the preceding paragraph, the shaft 78 is rotated clockwise (FIG. 4) and the release plunger 76 is permitted to move to the right, as viewed in FIG. 9, whereby the spring biased wire-gripping jaw 63 pivots clockwise to grip the wire in the percussion welding assembly with the cut end thereof projecting slightly below the welding assembly. As the percussion welding assembly 47 is moved further upward by its rotatable firing cam 69, a loop is formed in the wire 21 between the percussion welding assembly and the insulated pulley 62 thereabove. The loop in the wire 21 prevents tension from being applied to the wire as the percussion welding assembly moves downward to its welding position, and thereby substantially prevents pulling of the wire upward with respect to the percussion welding assembly during a welding operation.

As shown in FIG. 8, the percussion welding assemblies 47 are suitably insulated from one another, as for example, by insulator plates 82 and insulated bearings 83 for the rotatable shafts 71 and 78. The insulating of the percussion welding assemblies, where banks of capacitors are used as the electrical source for welding, substantially prevents premature discharge of the bank of capacitors for one of the percussion welding assemblies, as for example the left-hand percussion welding assembly, because of leakage when the right-hand percussion welding assembly reaches its welding position and discharges its bank of capacitors before the left hand percussion welding assembly.

Below the carriage 42 and the percussion welding assemblies 47 is a dry reed switch transfer device 84 (FIGS. 2 and 3) for transferring the dry reed switch 23 from the electrodes 46 on the carriage (FIG. 3) downward to a tubing shear-and-feed assembly 86 (FIG. 2), after the wires 21 have been welded to the switch terminals 22 and the wires have been released for free running movement through the percussion welding assemblies 47. The switch transfer device 84 includes an upstanding guide member 87 which extends upwardly between the projections 42a, 42b of the carriage 42, and which is pinned to one end of a shaft 88 rotatably mounted in a support 89 on the front of the main support wall 28. The other end of the rotatable shaft 88 has an operating arm 91 pinned thereto which extends rearwardly through a slot in the main support wall 28 and which is operatively connected to a cam 92 (FIG. 5) on one of the operating cam shafts 29. The configuration of the cam 92 is such that the upstanding guide member 87 is moved between the positions shown in solid lines and in dashed lines in FIG. 3, as the operating cam shaft 29 rotates.

Mounted on the upstanding guide member 87 is a vertically reciprocating slide 93 including a front body member 93a and a rear body member 93b, the front body member 93a having a rearwardly projecting portion disposed in a longitudinally extending guide slot in the upstanding guide member, substantially as shown. The front body member 93a includes an upper jaw 94, and a lower pivoted jaw 96. The lower jaw 96 is of nylon or other suitable material, so that it will not damage one of the dry reed switches 23 gripped between the jaws 94, 96, and is spring biased to a normally closed switch-gripping position with respect to the upper jaw 94. The lower jaw 96 includes laterally projecting pins 97 which engage forwardly directed integral lugs 98 (FIG. 3) on the upstanding guide member 87 when the slide 93 on the guide member reaches its upper position, whereby the lower jaw is pivoted to an open position with respect to the upper jaw 94.

The rear body member 93b of the slide 93 carries a roller 102 (FIG. 3) which is resiliently connected to one arm of a double arm lever assembly 103 (FIGS. 3 and 5) by a leaf spring 104 secured to the arm. The double arm lever assembly 103 is pivotally mounted on a rearwardly extending support 106 on the back of the main support wall 28, and has its other arm operatively connected to a cam 107 on one of the operating cam shafts 29 (FIG. 5). The configuration of the cams 92 and 107 for pivoting the upstanding guide member 87 and for moving the slide 93 along the guide member, respectively, is such that the slide 93 initially moves upwardly between the projections 42a, 42b of the carriage 42 behind the dry reed switch 23 on the electrodes 46, and then moves forward whereby the dry reed switch is received between the jaws 94, 96. The carriage 42 then is retracted by operation of its double arm lever assembly 44 and cam 45 and the slide 93 on the upstanding guide member 87 is moved downward by operation of its double arm lever assembly 103 and cam 107, until it engages an adjustable stop 108 on the upstanding guide member, thereby positioning the dry reed switch 23 in the tubing shear-and-feed assembly 86, and thereby pulling the wires 21 through the percussion welding assemblies 47 a desired amount.

Located below and to opposite sides of the percussion welding assemblies 47 are a pair of wire-cutting assemblies 109 (FIGS. 1 and 6) for cutting the wires 21 closely adjacent the lower ends of the percussion welding assemblies, thereby to produce the wire leads 24. Each of the wire-cutting assemblies 109 includes a reciprocating slide 111 movable in a guideway formed in a support 112 mounted on the front of the main support wall 28. As is best shown in FIG. 6, each of the slides 111 includes an upstanding lug 111a resiliently connected, by means of a leaf spring 113, to one arm of a double arm lever assembly 114 which is pivotally mounted on the back of the main support wall 28 and which has its other arm operatively connected to a suitable cam 116 on a respective one of the operating cam shafts 29.

Pivotally mounted at the forward end of each slide 111 are a pair of wire-cutting jaws 117 which are spring biased toward a normally open position. As is best shown in FIGS. 12 and 13 the wire-cutting jaws 117 have substantially blunt chisel-type cutting edges 117a which are arranged so as to be slightly spaced apart when the jaws are in a wire-cutting position. Slidably mounted on opposite sides of each slide 111 are a pair of longitudinally extending percussion rods 118 which are connected together at their trailing ends by a block member 119 for movement in unison, and which are driven by coil springs 121 (FIG. 1) against the wire-cutting jaws 117 to move the jaws to their closed wire-cutting position. As is best shown in FIG. 10, each block member 119 includes an upstanding lug 119a.

Fixed to the top of each of the supports 112 of the wire-cutting assemblies 109 is a bifurcated member 122 having a vertical shaft 123 rotatably mounted therein (FIG. 1). Secured to the lower end of each vertical shaft 123 in the path of movement of the upstanding lug 119a of the block member 119 associated with the shaft is a trigger member 124 in the form of a substantially cylindrical cam (FIG. 11) having a cutout portion 124a. Pinned to each vertical shaft 123 is an arm 126 which is pivotally connected to one end of an operating rod 127 (FIGS. 1 and 6), the operating rod 127 being connected at its other end to the one arm of the double arm lever assembly 114 by a pin 128 on the arm and a slot 129 in the operating rod.

When each of the slides 111 carrying the wire-cutting jaws 117 is in its retracted position, as shown in FIGS. 1 and 6, the wire-cutting jaws 117 are in a closed position. As the double arm lever assembly 114 for each slide 111 moves the slide toward its associated wire 21, the upstanding lug 119a on the block member 119 engages the trigger member 124 at 124b (FIG. 11) and movement of the percussion rods 118 with the slide 111 is stopped. The lever assembly 114 continues to move the slide 111 toward the wire 21, however, whereupon the wire-cutting jaws 117 are biased to their open position. The double arm lever assembly 114 then moves the slide 111 against an upstanding stop 131 on the front of the support 112 to position the wire-cutting edges of the jaws 117 on opposite sides of the wire 21. When the pin 128 on the double arm lever assembly 114 reaches the end of the slot 129 in the operating rod 127, the double arm lever assembly, as permitted by the leaf spring 113, moves the operating rod to pivot the trigger member counterclockwise, as viewed in FIG. 11, and the upstanding lug 119a moves into the cutout portion 124a of the trigger member. The coil spring 121 then drives the percussion rods 118 against the wire-cutting jaws 117 to move the blunt wire-cutting edges 117a of the jaws into wire-cutting engagement with the wire 21 at high speed and with great inertia, the force of the impact of the blunt wire-cutting edges 117a with the wire 21 causing the remaining uncut portion of the wire to be severed to provide a longitudinally extending, feathered projection 21a on the end of the wire, in the form of a thin wedge, as shown in FIGS. 14 and 15. The projection 21a concentraes the electrical field during a welding operation and substantially insures a relatively strong welding arc between the end of the wire 21 and the terminal 22 to which it is to be welded. When the slide 111 is moved back to its retracted position (FIGS. 1 and 6) by the double arm lever assembly 114, the slide 111, percussion rods 118 and block member 119 move as a unit, and upon the pin 128 on the double arm lever assembly 114 reaching the limit of its movement relative to the operating rod 127, as determined by the pin and slot connection 128, 129, the trigger member 124 is rotated back into the path of forward movement of the upstanding lug 119a.

The tubing shear-and-feed assembly 86 includes a pair of laterally spaced flanges 132 (FIGS. 2 and 7) mounted on the front of the main support wall 28. In abutting engagement with each of the flanges 132 is a rotatable carrier wheel 133 which includes a plurality of circumferentially spaced peripheral recesses 133a (FIGS. 2, 3 and 7) for receiving the terminals 22 of the dry reed switches 23 from the switch transfer device 84, and which includes a ratchet 133b. Each of the carrier wheels 133 includes a plurality of circumferentially spaced axial bores 134, the axial bores being aligned with respective ones of the peripheral recesses 133a. Each of the flanges 132 is provided with a lower tubing-receiving aperture 136 (FIG. 2), and a pair of upper plunger-receiving apertures 137 and 138 (FIGS. 2 and 7), each adapted to be successively aligned with the axial bores 134 in the carrier wheel 133 associated with the flange.

Mounted in suitable annular guideways on the facing sides of the spaced flanges 132 are a pair of ring members 139 (FIG. 2) which carry spring biased pawls 141, the pawls being engaged with the ratchets 133b of the carrier wheels 133. The ring members 139 include downwardly projecting lugs for pivotally connecting the ring members to respective spaced legs of a yoke member 142, which includes a rearwardly extending arm 142a integral therewith and extending through a slot in the main support wall 28 (FIGS. 3 and 7). The arm 142a connects the yoke member 142 to a double arm lever assembly 143, which is pivotally mounted on the back of the main support wall 28, and which is operatively connected to a cam 144 (FIG. 5) on one of the operating cam shafts 29. The configuration of the cam 144 is such that as the operating cam shaft 29 rotates, the yoke member 142 is reciprocated by the double arm lever assembly 143 to rotate the carrier wheels 133 in a step-by-step manner and in a counterclockwise direction, as viewed in FIG. 3. Rotation of the carrier wheels 133 causes tubing 26, fed through the apertures 136 in the spaced flanges 132 into the axial bores 134 in the carrier wheels by a pair of tubing feed mechanisms 146 (best shown in FIG. 2 and the right-hand side of FIG. 7), to be sheared into predetermined lengths by the carrier wheels and the flanges 132, and causes the sheared lengths of tubing 27 to be carried in the axial bores in the carrier wheels successively into axial alignment with the plunger-receiving apertures 138 in the flanges.

Each of the tubing feed mechanisms 146 includes a substantially horizontal support plate 147 mounted on the front of the main support wall 28 and having a guideway formed in its top side in which is mounted a horizontally reciprocating tubing feed slide 148. Each support plate 147 and its associated tubing feed slide 148 includes an upstanding lug 147a and a laterally extending lug 148a, respectively, the lugs having axially aligned apertures formed therethrough for receiving the tubing 26. Mounted on each of the lugs 147a and 148a are a pair of respective leaf springs 149 and 151. Each leaf spring 149 grips the tubing 26 as its tubing feed slide 148 moves toward the carrier wheel 133 associated with the tubing feed slide, thereby to feed the tubing through the aperture 136 in the flange 132 and into an aligned axial bore 134 in the carrier wheel 133. Each leaf spring 151 prevents retrograde movement of the tubing 26 when the tubing feed slide 148 associated therewith returns to a retracted position.

Mounted on the main support wall 28 above the tubing feed mechanisms 146 are respective plunger assemblies 152 (best shown in FIG. 2 and the left-hand side of FIG. 7) for feeding the short lengths of tubing 27 from the axial bores 134 in the carrier wheels 133 onto the dry reed switch terminals 22. Each of the plunger assemblies 152 includes a substantially horizontal support plate 153 having a guideway formed in its lower side in which is mounted a horizontally reciprocating, plunger-carrying slide 154. Mounted in each plunger-carrying slide 154 is a spring biased indexing plunger 156 and a spring biased tubing feed plunger 157, which project, respectively, into the apertures 137 and 138 in the flange 132 associated with the plunger-carrying slide, the indexing plunger 156 extending toward the carrier wheel 133 associated with the plungers beyond the end of the tubing feed plunger 157.

Each tubing feed slide 148 and its associated plunger-carrying slide 154 are reciprocated by a double arm lever assembly 158 pivotally mounted on the back of the main support wall 28 and operatively connected to a suitable cam 159 on a respective one of the operating cam shafts 29. One arm of each double arm lever assembly 158 has a notched end (FIG. 7) which engages a downwardly extending lug 161 (FIG. 2) on its associated plunger-carrying slide 154. Each downwardly extending lug 161 is engageable with a pair of spaced adjustment screws 162 and 163 on the tubing feed slide 148 beneath the lug, whereby movement imparted to the plunger-carrying slide 154 by its double arm lever assembly 158, moves the plunger-carrying slide relative to the tubing feed slide 148, and subsequently imparts movement to the tubing feed slide. Further, the adjustment screws 162 and 163 provide a means for varying the length of tubing fed into the axial bores 134 by the tubing feed slide 148.

As the yoke member 142, double arm lever assembly 143, and cam 144 rotate the carrier wheels 133 counterclockwise, as viewed in FIG. 3, and the double arm lever assemblies 158 and the cams 159 move the plunger-carrying slides 154 toward the carrier wheels, each of the indexing plungers 156 engages against the side surface of its associated carrier wheel until one of the axial bores 134 of the carrier wheel comes into alignment therewith, whereupon the indexing plunger moves into the axial bore, to align its associated tubing feed plunger 157 with the next succeeding axial bore 134, which contains a cut length of tubing 27, and to align the tubing 26, in the aperture 136 of the flange 132, with one of the axial bores 134 which is empty. As the plunger-carrying slides 154 continue to move toward the carrier wheels, the downwardly extending lugs 161 on the plunger-carrying slides engage the adjustment screws 162 to operate the tubing feed slides 148, whereby the tubing feed plungers 157 push the lengths of tubing 27 out of the axial bores 134 aligned therewith onto the switch terminals 22, and whereby tubing 26 is fed into the axial bores 134 aligned therewith, simultaneously. The carrier wheels 133, during their rotation, remove the assembled switches from the jaws 94, 96 of the dry reed switch transfer device 84 and discharge the switches from the apparatus into a discharge chute 164.

From the foregoing description it is apparent that new and improved apparatus has been provided which accomplishes the stated objects. The wire-cutting assemblies 109 sever the wires to form the longitudinally extending projections 21a on the ends of the wires 21, whereby strong electrical welding arcs are created between the ends of the wires 21 and the terminals 22 to provide secure welded connections, regardless of foreign matter which may have accummulated on the terminals. The operation of the releasale wire-gripping jaws 63 to form loops in the wires between the percussion welding assemblies 47 and the pulleys 62 substantially prevents pulling of the wires 21 upward through the percussion welding assemblies 47 during their downward strokes, and thereby helps prevent improper welding because of wire breakage, or because of the wires 21 not projecting beyond the percussion welding assemblies 47 a sufficient distance when they engage the terminals. The construction of the percussion welding assemblies 47 in two parts separated by the resilient springs 61 substantially reduces weakening of the welded connections because of excessive impact of the ends of the wires 21 with the terminals 22, and/or rebound of the ends of the wires away from the terminals. Secure welded connections between the wires 21 and the terminals 22 are desirable for reasons which are apparent, and are necessary so that the wires and the terminals will not pull apart during the transfer of the dry reed switches 23 from the carriage 42 to the tubing shear-and-feed assembly 86, and during the positioning of the short lengths of tubing 27 over the terminals and the wires by the tubing shear-and-feed assembly. The switch transfer device 84, in which the slide 93 and the laterally projecting jaws 94, 96 are arranged to move upward behind the dry reed switches 23 on the carriage 42, substantially insures positive removal of the switches from the carriage and positive pulling of the switches downward to the tubing shear-and-feed assembly 86 with the wires welded to the switches. The tubing shear-and-feed assembly 86 provides a rapid and efficient means for shearing tubing into preselected lengths and for positioning the lengths of tubing 27 over the terminals 22 of the dry reed switches 23, and in the normal operation thereof provides an inherent means for removing the assembled switches from the switch transfer device 84 and for discharging the switches from the apparatus. Further, the various parts of the apparatus cooperate to accomplish all of the foregoing without the necessity of manual operations or manual handling of the dry reed switches 23, the wire leads 24, or the lengths of tubing 27.

It is to be understood that the above-described arrangements are simply illustrative of the application of the principles of this invention. Numerous other arrangements readily may be devised by those skilled in the art which will embody the principles of the invention and fall within the spirit and scope thereof.

What is claimed is:

1. Apparatus for welding wire to an article, which comprises means for supporting an article, a first electrode for contacting the article, a reciprocating percussion assembly including a driving member and a percussion head connected for movement relative to one another within limits, resilient means disposed between said driving member and said percussion head, said percussion head including a second electrode, releasable means carried by said percussion head for gripping the wire in said second electrode with the end of the wire projecting slightly beyond one end of said percussion head, drive means engaged with said driving member for moving said percussion assembly toward the article so that the end of the wire engages the article and is welded thereto, and for moving said driving member relative to said percussion head to compress said resilient means after the end of the wire engages the article, said resilient means absorbing the inertia of said driving member and preventing rebound of said percussion head and the wire when the wire engages the article, wire-cutting means movable into wire-cutting engagement with the wire at high speed and with great inertia for severing the wire and forming a new end thereon after the wire has been welded to an article, stop means for limiting the movement of said wire-cutting means whereby said wire-cutting means cuts only partially through the wire, the remainder of the wire being severed by the force of the impact to form a wedge-like projection on the new end of the wire which substantially insures a relatively strong welding arc between the new end of the wire and a next article when the new end of the wire engages the next article, and means for cyclically operating said percussion assembly and said wire-cutting means in timed sequential relationship with respect to one another.

2. Apparatus for welding wire to an article, which comprises means for supporting an article, a first electrode for contacting the article, a reciprocating percussion assembly including a driving member and a percussion head connected for movement relative to one another within limits, resilient means disposed between said driving member and said percussion head, said percussion head including a second electrode, releasable means carried by said percussion head for gripping the wire in said second electrode with the end of the wire projecting slightly beyond one end of said percussion head, drive means engaged with said driving member for moving said percussion assembly toward the article so that the end of the wire engages the article and is welded thereto, and for moving said driving member relative to said percussion head to compress said resilient means after the end of the wire engages the article, said resilient means absorbing the inertia of said driving member and preventing rebound of said percussion head and the wire when the wire engages the article, a pivotally mounted reciprocating carriage including a pair of laterally projecting spaced jaws movable relative to one another for gripping a portion of the article which projects beyond said support means, said carriage being movable laterally with respect to the article on said support means for removing the article therefrom, and being movable with respect to said percussion assembly for pulling the wire welded to the article through said percussion assembly, wire-cutting means movable into wire-cutting engagement with the wire at high speed and with great inertia for severing the wire and forming a new end thereon after the wire has been welded to the article, stop means for limiting the movement of said wire-cutting means whereby said wire-cutting means cuts only partially through the wire, the remainder of the wire being severed by the force of the impact to form a wedge-like projection on the new end of the wire which substantially insures a relatively strong welding arc between the new end of the wire and a next article when the new end of the wire engages the next article, and means for cylically operating said percussion assembly and said wire-cutting means in timed relationship with respect to one another.

3. Apparatus for welding wire to an article which comprises a source of wire, means for supporting an article, a first electrode for contacting the article, a reciprocating percussion assembly movable between advanced and retracted positions and having a second electrode, releasable means carried by said percussion assembly for gripping a wire in electrical contact with said second electrode and so that an end of the wire projects slightly beyond one end of said percussion assembly, means for driving said percussion assembly into its advanced position toward the article so that the end of the wire engages the article and is welded thereto, article-gripping means for removing the article from said support means and pulling the wire through said percussion assembly, wire-cutting means for severing the wire and forming a new end thereon after the wire has been welded to the article and pulled through said percussion assembly, and means for operating said releasable means to release the wire during the pulling of the wire by said article-gripping means, and to grip the wire during the movement of said percussion assembly to its retracted postion to form a loop in the wire between said percussion assembly and said wire source, the loop in the wire substantially preventing pulling of the wire relative to said percussion assembly as said percussion assembly is driven to its advanced position.

4. A device for welding wire to an article, which comprises means for supporting an article, a first electrode for contacting the article, a reciprocating percussion assembly including a driving member and a percussion head connected for movement relative to one another within limits, resilient means disposed between said driving member and said percussion head, said percussion head including a second electrode, releasable means carried by said percussion head for gripping the wire in said second electrode with the end of the wire projecting slightly beyond one end of said percussion head and drive means engaged with said driving member for moving said percussion assembly toward the article so that the end of the wire engages the article andi s welded thereto, and for moving said driving member relative to said percussion head to compress said resilient means after the end of the wire engages the article, said resilient means absorbing the inertia of said driving member and preventing rebound of said percussion head and the wire when the end of the wire engages the article.

5. A device for welding wire to an article, which comprices means for supporting an article, a first electrode for contacting the article, a reciprocable percussion assembly including a driving member and a percussion head connected for movement relative to one another within limits, first resilient means disposed between said driving member and said percussion head, said percussion head including a second electrode, releasable means carried by said percussion head for gripping the wire in said second electrode with the end of the wire projecting slightly beyond one end of said percussion head, second resilient means of greater strength than said first resilient means engaged with said driving member for moving said percussion assembly toward the article so that the end of the wire engages the article and is welded thereto, and for moving said driving member relative to said percussion head to compress said first resilient means after the end of the wire engages the article, a cam surface on said driving member, a movable cam engaged with said cam surface, and means for moving said cam to move said percussion assembly against the action of said second resilient means, and to permit movement of said percussion assembly toward the article by said second resilient means whereby the end of the wire engages the article and is welded thereto, said first resilient means absorbing the inertia of said driving member and preventing rebound of said percussion head and the wire when the end of the wire engages the article.

6. A device for welding wire to an article, which comprises means for supporting an article, a first electrode for contacting the article, a reciprocable percussion assembly including a driving member and a percussion head connected for movement relative to one another within limits, first resilient means disposed between said driving member and said percussion head, said percussion head including a second electrode, releasable spring biased means carried by said percussion head for gripping the wire in said second electrode with the end of the wire projecting slightly beyond one end of said percussion head toward said first electrode, second resilient means of greater strength than said first resilient means drivingly engaging said driving member for moving said percussion assembly toward said support means, a laterally projecting pin on said driving member, a rotatable cam engaged with said pin and including a plurality of successive peripheral camming surfaces separated by successive peripheral recesses, and ratchet and pawl means for rotating said cam in one direction to engage said pin alternately with a camming surface and in a recess, whereby said cam alternately moves said percussion assembly away from said support means against the action of said second resilient means, and permits movement of said percussion assembly toward said support means by said second resilient means so that the end of the wire engages the article and is welded thereto, said first resilient means absorbing the inertia of said driving member and preventing rebound of said percussion head and the wire when the end of the wire engages the article, and said pin preventing reverse rotation of said cam when said pin is engaged in one of the peripheral recesses of said cam.

7. A device for cutting wire, which comprises a reciprocating carriage movable toward a wire, a pair of opposed cutter members mounted on said carriage and movable to an open position for receiving the wire therebetween, said cutter members including opposed wire-cutting edges which are spaced slightly apart when said cutter members are in a closed position, a pair of spaced percussion rods slidably mounted adjacent opposite sides of said carriage for movement in unison relative to said carriage to move said cutter members into a closed position, stop means for limiting the movement of said carriage toward the wire, first means for moving said carriage toward the wire against said stop means, and second means operatively connected to said first means for moving said percussion rods relative to said carriage after said stop means has become operative, to move the wire-cutting edges of said cutter members into engagement with the wire at high speed and with great inertia, said wire-cutting edges cutting only partially through the wire and the remaining portion of the wire being severed by the force of the impact to form a wedge-like projection on the end of the wire.

8. A device for cutting wire, which comprises a reciprocating carriage movable toward a wire, a pair of opposed cutter members mounted on said carriage and movable to an open position for receiving the wire therebetween, said cutter members including opposed wire-cutting edges which are spaced slightly apart when said cutter members are in a closed position, a pair of spaced percussion rods slidably mounted adjacent opposite sides of said carriage for movement in unison relative to said carriage to move said cutter members into a closed position, resilient means for moving said rods toward said cutter members, cam means for normally preventing movement of said rods by said resilient means and movable to permit movement of said rods by said resilient means, stop means for limiting the movement of said carriage toward the wire, first means for moving said carriage toward the wire against said stop means, and second means operatively connected to said first means for moving said cam means to permit movement of said rods by said resilient means after said stop means has become operative, said resilient means moving said rods to move the wire-cutting edges of said cutter members into engagement with the wire at high speed and with great inertia, said wire-cutting edges cutting only partially through the wire and the remaining portion of the wire being severed by the force of the impact to form a wedge-like projection on the end of the wire.

9. A device for cutting wire to form a wedge-like projection on the end of the wire, which comprises a reciprocating carriage movable toward a wire, a pair of opposed cutter members pivotally mounted on said carriage and spring biased toward a normally open position for receiving the wire therebetween, said cutter members including opposed substantially blunt wire-cutting edges which are spaced slightly apart when said cutter members are in a closed position, a pair of spaced longitudinally extending percussion rods slidably mounted adjacent opposite sides of said carriage for movement relative to said carriage to move said cutter members to a closed position, a laterally extending member connecting said rods together for movement in unison and including a projecting lug, resilient means biasing said laterally extending member and said rods toward said cutter members, a rotatable cam which cooperates with the projecting lug for normally preventing movement of said rods by said resilient means and including a cut-out peripheral portion for receiving the lug to permit movement of said rods by said resilient means, adjustable stop means for limiting the movement of said carriage toward the wire, a cam operated pivoted lever yieldably connected to said carriage for moving said carriage toward the wire against said stop means, and pivoted linkage connected to said lever and movable thereby for rotating said cam after said stop means has become operative, whereby the cut-out portion of said cam receives the projecting lug to permit movement of said rods by said resilient means, said resilient means moving said rods to move the wire-cutting edges of said cutter members into engagement with the wire at high speed and with great inertia, said wire-cutting edges cutting only partially through the wire and the remaining portion of the wire being severed by the force of the impact to form a wedge-like projection on the end of the wire.

10. Apparatus which comprises, means for supporting an article, a first electrode for contacting the article, a reciprocating percussion assembly having a second electrode adapted to releasably grip a wire, said percussion assembly being movable toward the article for moving an end of the wire into engagement with the article so that the end of the wire is electrically welded thereto, tubing shear-and-feed means spaced from said support means for shearing tubing into preselected lengths and positioning a length of tubing over the article and a portion of the wire which has been welded to the article, article transfer means for transferring the article with the wire welded thereto from said support means to said tubing shear-and-feed means, and operative to pull the wire through said percussion assembly, wire-cutting means for severing the wire to form a new end on the wire and to produce a length of wire welded to the article after the article has been transferred to said tubing shear-and-feed means by said transfer means, said tubing shear-and-feed means including means for removing the article with the length of wire welded thereto from said transfer means and discharging the article from the apparatus, and means for operating said percussion assembly, said article transfer means, said wire-cutting means, and said tubing shear-and-feed means in timed relationship with respect to one another.

11. Apparatus which comprises, means for supporting an article, a first electrode for contacting the article, a reciprocating percussion assembly including a driving member and a percussion head connected for movement relative to one another within limits, resilient means disposed between said driving member and said percussion head, said percussion head including a second electrode, releasable means carried by said percussion head for gripping a wire in said second electrode with the end of the wire projecting slightly beyond one end of said percussion head, drive means engaged with said driving member for moving said percussion assembly toward the article so that the end of the wire engages the article and is welded thereto, and for moving said driving member relative to said percussion head to compress said resilient means after the end of the wire engages the article, said resilient means absorbing the inertia of said driving member and preventing rebound of said percussion head and the wire when the wire engages the article, tubing shear-and-feed means spaced from said support means for shearing tubing into preselected lengths and positioning a length of tubing over the article and a portion of the wire which has been welded to the article, article-transfer means for transferring the article with the wire welded thereto from said support means to said tubing shear-and-feed means, and operative to pull the wire through said percussion assembly, wire-cutting means movable into wire-cutting engagement with the wire at high speed and with great inertia for severing the wire to form a new end thereon and to produce a length of wire welded to the article after the article has been transferred to said tubing shear-and-feed means by said article-transfer means, stop means for limiting the movement of said wire-cutting means whereby said wire-cutting means cuts only partially through the wire, the remainder of the wire being severed by the force of the impact to form a wedge-like projection on the new end of the wire which substantially insures a relatively strong welding arc between the new end of the wire and a next article when the new end of the wire engages the next article, said tubing shear-and-feed means including means for removing the article with the length of wire welded thereto from said article-transfer means and discharging the article from the apparatus, and means for cyclically operating said percussion assembly, said article-transfer means, said wire-cutting means and said tubing shear-and-feed means in timed relationship with respect to one another.

12. Apparatus which comprises, a reciprocating carriage movable between advanced and retracted positions, said carriage having a pair of spaced forwardly extending projections for supporting opposite end portions of an article, first electrodes for contacting the end portions of the article, a pair of reciprocating percussion assemblies each of which includes a driving member and a percussion head connected for movement relative to one another within limits, resilient means disposed between each driving member and its associated percussion head, said percussion heads including second electrodes, releasable means carried by said percussion heads for gripping wires in said second electrodes with the ends of the wires projecting slightly beyond said percussion heads, drive means engaged with said driving members for moving said percussion assemblies toward the end portions of the article when said carriage is in its advanced position to move the ends of the wires into engagement with the end portions of the article for welding thereto, and for moving said driving members relative to said percussion heads to compress said resilient means after the ends of the wires engage the article, said resilient means absorbing the inertia of said driving members and preventing rebound of said percussion heads and the wires when the ends of the wires engage the article, tubing shear-and-feed means spaced from said carriage for shearing protective tubing into preselected lengths and positioning lengths of tubing over the opposite end portions of the article and adjacent portions of the wires which have been welded to the article, article-transfer means movable between the projections on said carriage for removing the article with the wires welded thereto from said projections, and movable to transfer the article from said carriage to said tubing shear-and-feed means, said transfer means pulling the wires welded to the article through said percussion assemblies, wire-cutting means movable into wire-cutting engagement with the wires at high speed and with great inertia for severing the wires to form new ends thereon and to produce lengths of wire welded to the end portions of the article after the article has been transferred to said tubing shear-and-feed means by said article-transfer means, stop means for limiting the movement of said wire-cutting means whereby said wire-cutting means cut only partially through the wires, the remainder of each wire being severed by the force of the impact to form a wedge-like projection on the new end of the wire which substantially insures a relatively strong welding arc between the new end of the wire and a next article when the new end of the wire engages the next article, said tubing shear-and-feed means including means for removing the article with the lengths of wire welded thereto from said article transfer means and discharging the article from the apparatus, means for feeding articles to said carriage in its retracted position, and means for cyclically operating said feed means, said carriage, said percussion assemblies, said article-transfer means, said wire-cutting means, and said tubing shear-and-feed means in timed relationship with respect to one another, said operating means including a pair of spaced parallel cam shafts, a plurality of cams on each of said cam shafts, and lever means connecting said cams with said feed means, said carriage, said percussion assemblies, said article-transfer means, said wire-cutting means, and said tubing shear-and-feed means, respectively.

13. Apparatus for electrically percussive welding a thin wire to an article, which comprises wire-cutting means, means for moving said wire-cutting means into wire-cutting engagement with the wire at high speed and with great inertia, means for limiting the movement of said wire-cutting means such that said wire-cutting means cuts only partially through the wire, the remaining portion of the wire being severed by the force of the impact to form an axially extending, feathered, wedge-like projection on the end of the wire, and means for electrifically percussive welding the thus formed end of the wire to the article.

14. Apparatus for electrically percussive welding a thin wire to an article, which comprises a pair of opposed cutter members movable relative to one another and including opposed substantially blunt wire-cutting edges which are spaced slightly apart when said cutter members are in a closed position, means for moving said cutter members relative to one another into their closed position so that said blunt wire-cutting edges engage the wire between the cutter members at high speed and with great inertia, said blunt wire-cutting edges cutting only partially through the wire and the remaining portion of the wire being severed by the force of the impact to form an axially and diametrically extending, feathered projection on the end of the wire, and means for electrically percussive welding the thus formed end of the wire to the article.

15. Apparatus which comprises, means for supporting an article, a first electrode for contacting the article, a reciprocating percussion assembly having a second electrode adapted to releasably grip a wire, said percussion assembly being movable toward the article for moving an end of the wire into engagement with the article so that the end of the wire is electrically welded thereto, tubing shear-and-feed means spaced from said support means for shearing tubing into preselected lengths and positioning a length of tubing over the article and a portion of the wire which has been welded to the article, article-transfer means for transferring the article with the wire welded thereto from said support means to said tubing shear-and-feed means, and operative to pull the wire through said percussion assembly, wire-cutting means for severing the wire to form a new end on the wire and to produce a length of wire welded to the article after the article has been transferred to said tubing shear-and-feed means by said transfer means, and means for operating said percussion assembly, said article transfer means, said wire-cutting means, and said tubing shear-and-feed means in timed relationship with respect to one another.

16. Apparatus for welding wire to an article, which comprises means for supporting an article, a first electrode for contacting the article, a reciprocating percussion assembly movable between advanced and retracted positions and having a second electrode, releasable means carried by said percussion assembly for gripping a wire in electrical contact with said second electrode and so that an end of the wire projects a desired distance beyond one end of said percussion assembly, resilient means for driving said percussion assembly into its advanced position, means for moving said percussion assembly to its retracted position against the action of said resilient means and for releasing said percussion assembly such that said resilient means drives said percussion assembly to its advanced position in two separate stages, said percussion assembly in the first stage of its movement to its advanced position moving the end of the wire into engagement with the article so that the end of the wire is welded thereto, article gripping means for removing the article from said support means and pulling the wire through said percussion assembly, wire-cutting means for severing the wire and forming a new end thereon between the article and the one end of said percussion assembly after the wire has been welded to the article and pulled through said percussion assembly, after which said percussion assembly is released for the second stage of its movement to its advanced position and is moved relative to the wire into its advanced position by said resilient means, and means for operating said releasable means to release the wire during the pulling of the wire through said percussion assembly by said article gripping means and during the second stage of the movement of said percussion assembly to its advanced position, and to regrip the wire after said percussion assembly has been moved to its advanced position such that the newly formed end on the wire projects the desired distance from the one end of said percussion assembly for welding of the wire to a next article.

References Cited in the file of this patent

UNITED STATES PATENTS

| | | |
|---|---|---|
| 557,018 | Philipp | Mar. 24, 1896 |
| 1,366,063 | Culhane | Jan. 18, 1921 |
| 2,057,928 | Stahl | Oct. 20, 1936 |
| 2,224,975 | McNamara | Dec. 17, 1940 |
| 2,390,072 | Beaton | Dec. 4, 1945 |
| 2,508,758 | Hollerith | May 23, 1950 |
| 2,609,107 | Gray | Sept. 2, 1952 |
| 2,648,383 | Hahn | Aug. 11, 1953 |
| 2,800,702 | Abplanalp | July 30, 1957 |
| 2,809,274 | Quinlan | Oct. 8, 1957 |
| 2,829,423 | Long | Apr. 8, 1958 |
| 2,883,815 | Maitino | Apr. 28, 1959 |
| 2,986,625 | Houda | May 30, 1961 |